United States Patent [19]
Holland

[11] 4,005,790
[45] * Feb. 1, 1977

[54] PAVING MATERIAL CONVEYOR SYSTEM
[75] Inventor: John H. Holland, Norman, Okla.
[73] Assignee: Arkansas Rock and Gravel Co., Mufreesboro, Ark.
[ * ] Notice: The portion of the term of this patent subsequent to Mar. 7, 1989, has been disclaimed.
[22] Filed: Aug. 20, 1971
[21] Appl. No.: 173,423

Related U.S. Application Data
[63] Continuation-in-part of Ser. No. 852,345, Aug. 22, 1969, Pat. No. 3,647,096.

[52] U.S. Cl. .............................. 214/83.36; 222/328
[51] Int. Cl.² ........................................... B60P 1/38
[58] Field of Search ...................... 214/17 D, 83.36; 198/57; 222/328, 415

[56] References Cited
UNITED STATES PATENTS

| | | | |
|---|---|---|---|
| 2,609,116 | 9/1952 | Beck | 214/83.36 |
| 2,626,068 | 1/1953 | Bradshaw | 214/83.36 |
| 3,482,717 | 12/1969 | Moser | 214/83.36 |
| 3,647,096 | 3/1972 | Holland | 214/83.36 |

FOREIGN PATENTS OR APPLICATIONS 1,024,364  3/1966  United Kingdom ............ 214/83.36

Primary Examiner—Robert G. Sheridan
Attorney, Agent, or Firm—Hubbard, Thurman, Turner & Tucker

[57] ABSTRACT

A conveyor system for slip-form concrete and similar paving materials includes a V-shaped hopper having a material supporting beam extending longitudinally through it, and a conveyor for unloading paving materials from the hopper. The vertical positioning of the material supporting beam in the hopper is adjustable to control the amount of material that is unloaded during each increment of conveyor travel. The hopper includes channels which both protect and provide access to the components of the conveyor and the material supporting beam is supported solely at its ends, so that the system may be thoroughly cleaned after each use.

8 Claims, 14 Drawing Figures

INVENTOR:

JOHN H. HOLLAND

Richards, Harris & Hubbard

ATTORNEYS

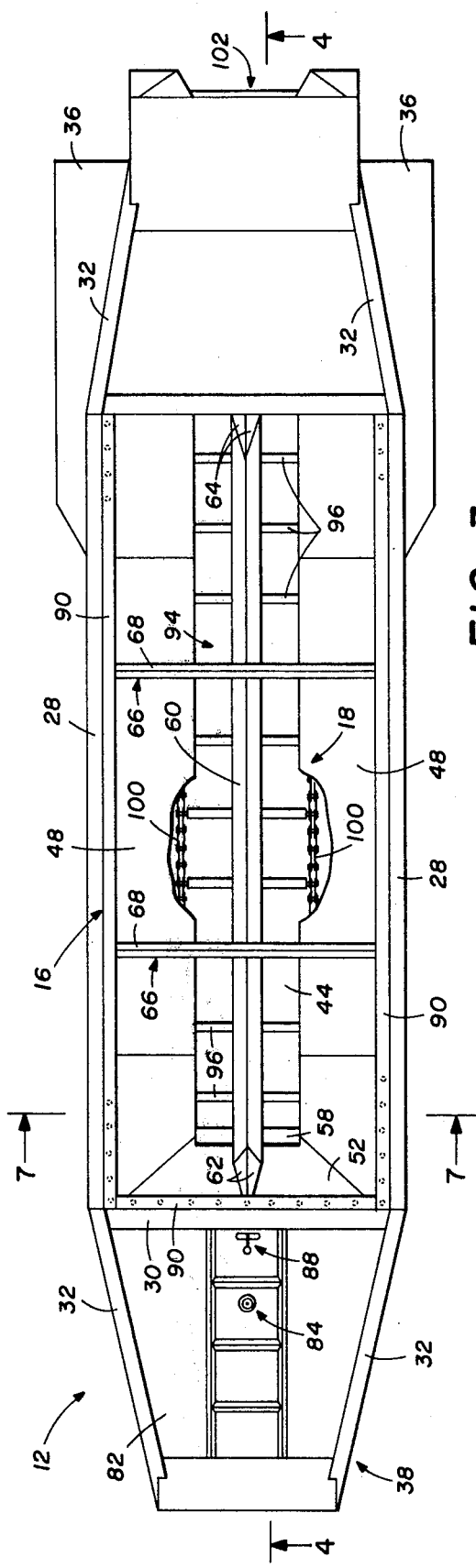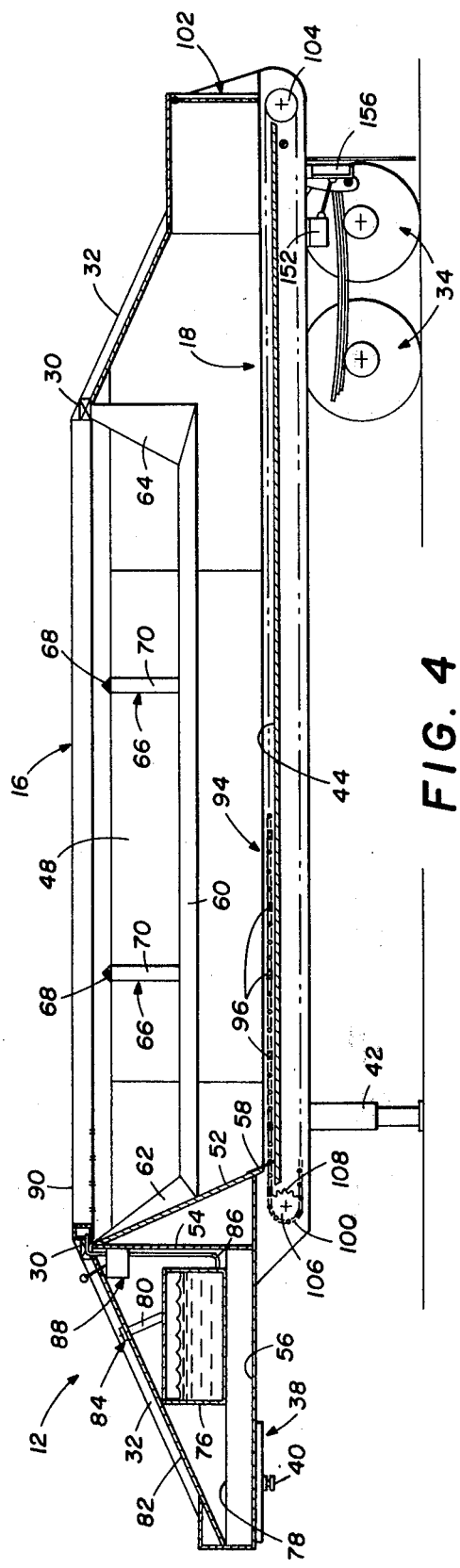

INVENTOR
JOHN H. HOLLAND

INVENTOR:
JOHN H. HOLLAND

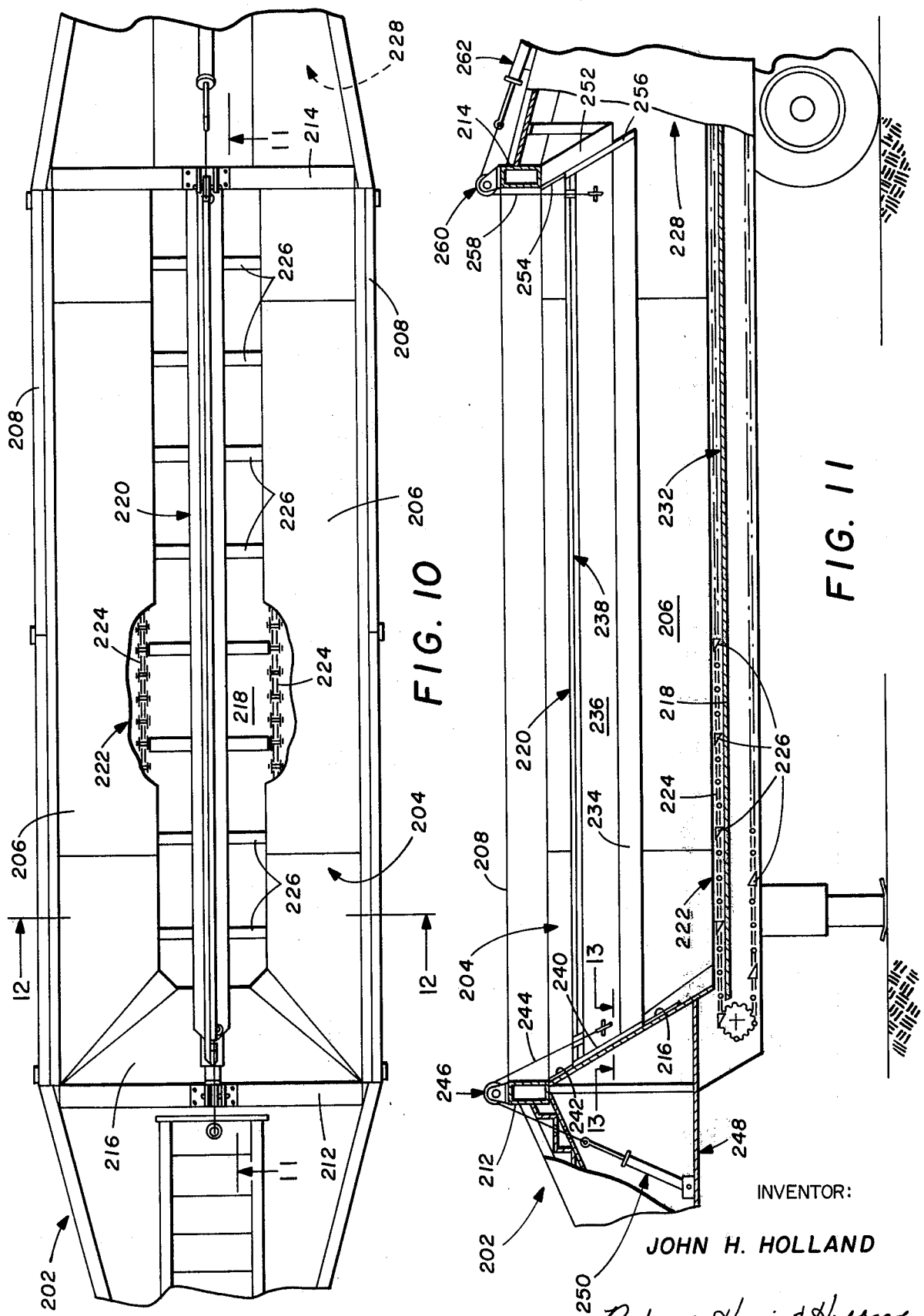

INVENTOR:
JOHN H. HOLLAND

ATTORNEYS

PAVING MATERIAL CONVEYOR SYSTEM

CROSS REFERENCE TO RELATED APPLICATIONS

This application comprises a continuation-in-part of the co-pending application of John H. Holland filed Aug. 22, 1969, Ser. No. 852,345, now U.S. Pat. No. 3,647,096.

BACKGROUND OF THE INVENTION

In the paving industry, hot asphalt is commonly transported to paving sites in dump trucks. The trucks receive hot asphalt from an asphalt mechanism located at an asphalt plant and deliver it to paving machines located at the paving sites. Modern paving machines have the ability to lay down hot asphalt very rapidly. Because of this, a large number of dump trucks is required to keep a paving machine supplied with asphalt, especially when the machine is located at a paving site remote from the asphalt plant.

As the number of tucks employed to transport hot asphalt to paving machines increases, a number of problems arise. For example, delays caused by traffic problems and the like are magnified when a large number of trucks are involved. Also, the logistics of truck maintenance increases greatly. Finally, it is more difficult to keep track of and control over a large number of trucks. Thus, it is highly desirable to reduce the number of trucks employed in an asphalt supply operation.

Heretofore, attempts to reduce the number of trucks required to supply asphalt to paving machines have centered around the design and use of large capacity dump trucks for transporting hot asphalt. Large capacity dump trucks have not gained wide acceptance for use in transporting asphalt because the use of such trucks results in several problems. For example, asphalt supply trucks must be operated in such a manner as to feed the asphalt gradually into the paving machines. When dump trucks are used to supply asphalt, this is accomplished by slowly raising the bed of the truck as the truck moves forward ahead of the paving machine. During such a process, if the dump truck and the paving machine become separated, asphalt is dumped onto the ground ahead of the paving machine. In such an event, the asphalt must be shoveled away from the path of the paving machine before more asphalt can be laid down. Obviously the larger the capacity of the dump truck the greater the shoveling problem is whenever a separation occurs.

Another problem that results from the use of large capacity dump trucks involves the tendency of asphalt to form into clumps or batches. These clumps tend to remain in the bed of a dump truck as it is raised and to then fall suddenly through the rear of the truck into the paving machine that is receiving asphalt from the truck. When this occurs, the paving machine forms waves or ridges in the pavement being laid down. Also, when large clumps fall from a dump truck, the truck often becomes dangerously unbalanced.

Yet another problem that arises from the use of large dump trucks relates to overhead obstructions such as wires, trees, viaducts, etc. Asphalt cannot be delivered to a paving machine from a dump truck except by raising the bed of the truck. When an overhead obstruction prevents the raising of the bed, other means for delivering asphalt to the paving machine must be found.

A very critical problem involving the use of large capacity dump trucks to transport results from the tendency of asphalt to flow from the rear or bottom of a dump bed first and to remain in the front or top of the bed as the bed is raised. Most large capacity dump trucks have a relatively long dump bed. The presence of asphalt in the front or top of a long dump bed as the bed is raised results in a very marked tendency of the truck to tip over. This problem is so acute that large capacity dump trucks are seldom used to transport asphalt to paving sites having any appreciable slant or bank.

The co-pending application of Robert D. Plant filed Aug. 22, 1969, Ser. No. 852,350, now U.S. Pat. No. 3,608,446, relates to a material delivery system in which hot asphalt is transported to paving machines in large capacity semi-trailers. Each trailer is provided with a conveyor system for moving the asphalt from the trailer to a paving machine. The trailers are not dumped and, accordingly, the problems of asphalt clumping and truck overturning experienced in the use of large capacity dump trucks are eliminated. Operation of the trailer is controlled from the paving machines that receive the asphalt. This assures both delivery of the asphalt at the proper rate and immediate termination of delivery upon the separation of the trailer and paving machine.

The above-identified co-pending application of John H. Holland relates to an improvement over the material delivery system disclosed in the above-identified application of Robert D. Plant. In the improved version of the system, the movement of asphalt out of the trailers is facilitated by spraying the trailers with lubricating oil before they are loaded with asphalt. An asphalt supporting beam is positioned above and parallel to the conveyor of each trailer. The beam prevents excessive asphalt packing in the trailer without hindering the unloading of asphalt.

The improved version of the system is further characterized in that the operation of the conveyor of each trailer is controlled by a valve mounted on the trailer. The valves are positioned on the trailers for actuation by prods mounted on the paving machines. This permits both control of the unloading of the trailers from the paving machines and the unloading of the trailers in situations where no prod is available.

It will be appreciated that many of the problems that are involved in the transportation of hot asphalt also arise in the transportation of other paving materials, such as slip-form concrete, etc. One additional problem that is encountered in the delivery of slip-form concrete and similar materials is the necessity of thoroughly cleaning the delivery vehicles after each use. The present invention relates to an embodiment of the improved material delivery system disclosed in the above-identified application of John H. Holland that is especially adapted to the delivery of slip-form concrete, and the like.

SUMMARY OF THE INVENTION

In accordance with the preferred embodiment of the invention, a conveyor system includes a hopper, a conveyor for transporting material relative to the hopper and a material supporting member selectively positionable in the hopper to control the volume of material transported during each increment of the conveyor operation. Preferably, the hopper includes channels which protect the conveyor and yet provide access thereto, and the material supporting member is supported solely at its ends. The latter features facilitate thorough cleaning of the system, and thereby adapt the system to use with slip-form concrete and similar materials.

DESCRIPTION OF THE DRAWINGS

A more complete understanding of the invention may be had by referring to the following Detailed Description when taken in conjunction with the Drawings, wherein:

FIG. 3 is a top view of the trailer shown in FIG. 2 in which certain parts have been broken away;

FIG. 4 is a side view of the trailer shown in FIG. 2 in which certain parts have been broken away and certain other parts have been illustrated schematically;

FIG. 10 is a partial top view of a second embodiment of the semi-trailer;

FIG. 11 is a sectional view taken generally along the line 11—11 in FIG. 10;

DETAILED DESCRIPTION

Figure 1:
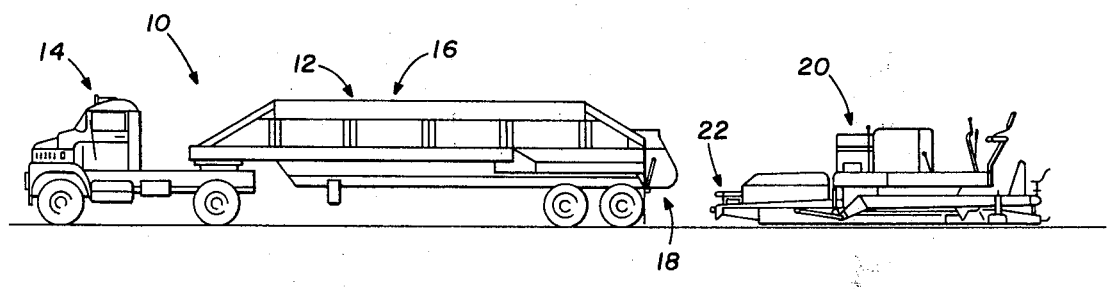
FIG. 1 is a side view of a portion of a material delivery system employing the invention.

Referring now to the Drawings, like reference numerals designate like parts throughout the several views. Referring particularly to FIG. 1, there is shown a material delivery system 10 employing the invention. The delivery system 10 includes a plurality of semi-trailers 12 (only one of which is shown) each adapted for a connection to and transportation by a conventional tractor 14. Each of the trailers 12 includes a hopper assembly 16 and an unloading assembly 18.

The trailers 12 of the system 10 receive hot asphalt from an asphalt mixing mechanism located at an asphalt plant (not shown) and deliver the hot asphalt to a paving machine 20 located at a paving site. The paving machine 20 supplied by the trailers 12 is conventional except that it is equipped with a prod 22 that is employed in controlling the unloading assemblies 18 of the trailers 12.

Figure 5:
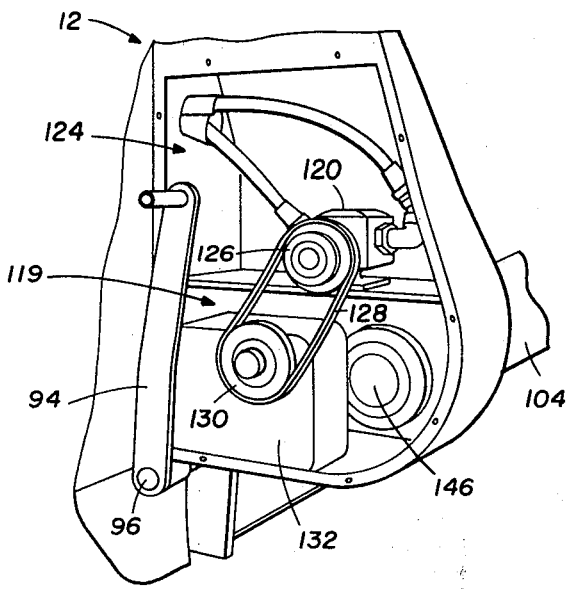
FIG. 5 is a partial perspective view illustrating the left rear of the trailer shown in FIG. 2.
Figure 6:
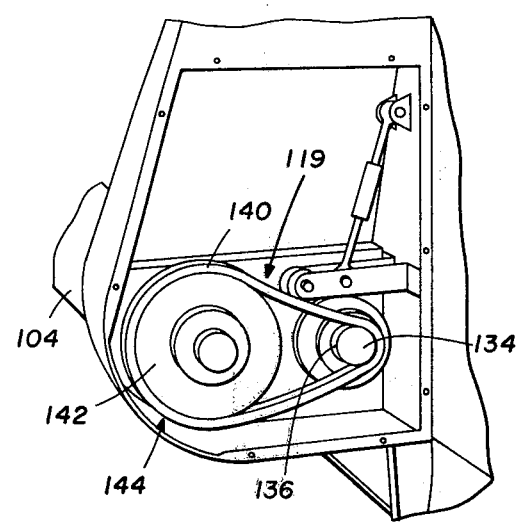
FIG. 6 is a view similar to FIG. 5 illustrating the right rear of the trailer.
Figure 7:
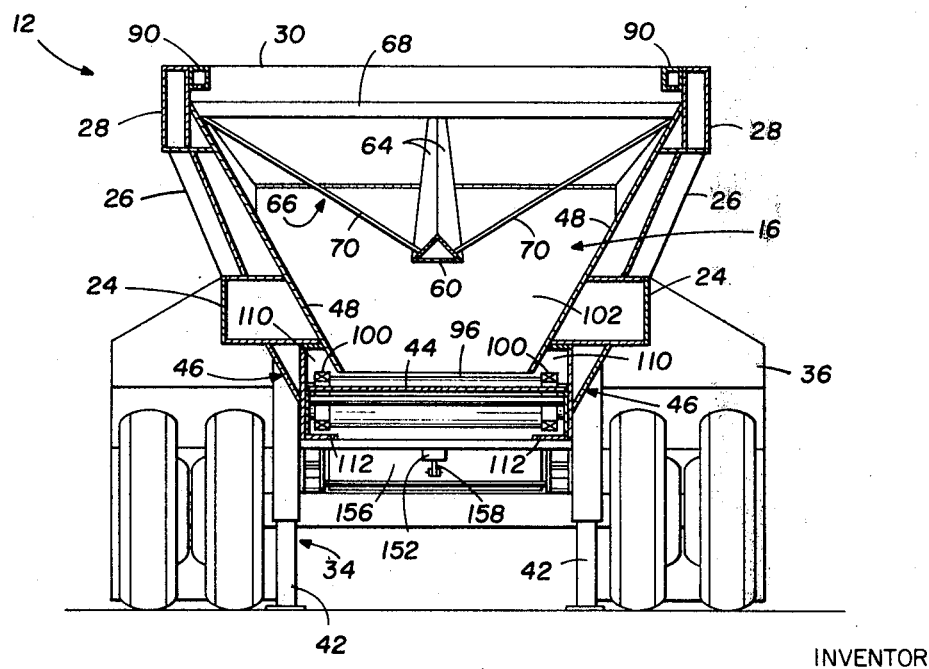
FIG. 7 is a transverse sectional view of the trailer shown in FIG. 2.

Referring now to FIGS. 2 through 8 and particularly to FIGS. 3, 4, and 7, the structural detail of the trailers 12 of the system 10 are shown. The main structural elements of each trailer 12 are a pair of main beams 24 which extend the length of the trailer 12. A plurality of support beams 26 extend upwardly and outwardly from each of the beams 24. A top beam 28 extends along each side of the trailer 12 and is connected to the tops of the beams 26. A pair of end beams 30 extend between the ends of the top beams 28 and two pairs of slanting beams 32 extend from the main beam 24 to the top beam 28 at the front and at the rear of the trailer 12.

The main beams 24 of each trailer 12 are supported on a pair of conventional wheel and axle assemblies 34. A pair of fenders 36 extend outwardly from the main beams 24 over the wheels of the wheel and axle assemblies 34. At the front end of each trailer 12, a gooseneck assembly 38 including a conventional fifth wheel 40 is provided for attaching the trailer 12 to a conventional tractor 14. A pair of conventional support jacks 42 extend downwardly from the main beam 24 for supporting the trailer 21 whenever it is not connected to a tractor 14.

The details of the hopper assemblies 16 of the trailers 12 are also illustrated in FIGS. 3, 4, and 7. Each hopper assembly 16 includes a floor 44 which is supported below the main beams 24 of the trailer 12 by a pair of sub-frame assemblies 46. A pair of side walls 48 slope upwardly and outwardly with respect to the floor 44 and are supported on the main beams 24 and the top beams 28. The walls 48 each extend at an angle of approximately 60° with respect to the floor 44.

Each hopper 16 further includes a sloping front wall 52 extending between the main beams 24 and the end beam 30 at the front of the trailer 12. As is best shown in FIG. 4, the front wall 52 is reinforced by a plate 54 which extends vertically between the main beams 24 and the end beam 30 and a plate 56 which extends horizontally between the main beams 24. A rubber sealing member 58 extends from the front wall 52 to the floor 44.

An asphalt supporting beam 60 extends along the axial center of the trailer 12. The beam 60 is triangular in shape and extends the entire length of the hopper 16. The front end of the beam 60 is supported by a pair of triangularly shaped plates 62 that are fixed to the front wall 52 and to the beam 60. The rear end of the beam 60 is supported by a pair of plates 64 that are fixed to the end beam 30 at the rear of the trailer 12 and to the beam 60. The center of the beam 60 is supported by a pair of support assemblies 66. As is best shown in FIG. 7, each assembly 66 includes a beam 68 that extends between the top beams 28 of the trailer and a pair of flat bars 70 which extend angularly downwardly from the beam 68 to the beam 60.

It should be understood that the hopper assembly illustrated in the drawings can be employed in many applications other than asphalt delivery trailers. For example, the hopper can be used in stationary applications such as coal bins, etc. Furthermore, the hopper can be employed as a part of various material delivery vehicles which need not be of the trailer variety.

Each trailer 12 of the delivery system 10 is provided with a system for lubricating the side walls 48 and the front wall 52 of the hopper 16 before asphalt is loaded into the hopper. As is best shown in FIG. 4, the lubricating system includes a tank 76 that is supported by a plate 78 which extends through the gooseneck assembly 38 parallel to the plate 56. A filler tube 80 extends from the tank 76 through a plate 82 that is mounted between the slanting beams 32 at the front of the trailer 12.

The filler tube 80 is provided with a removable cap 84. The cap 84 includes an air valve of the type commonly employed in automobile tires. In use, the cap 84 is removed and a suitable lubricating fluid is pumped into the tank 76. The cap 84 is then replaced and compressed air is directed through the air valve in the cap to pressurize the interior of the tank 76.

A tube 86 extends from the tank 76 to a valve 88 having a control handle that extends through the plate 82. The outlet of the valve 88 is connected to a square tube 90 that extends around the side walls 48 and the front walls 52 of the trailer 12. The tube 90 has holes formed through it at spaced points along the bottom side. Therefore, whenever the valve 88 is opened, lubricating fluid from the tank 76 is sprayed onto the side walls 48 and the front wall 52 through the holes in the tube 90.

Of course, any lubricating fluid can be employed in the lubricating system. It has been found that diesel fuel works very well as a hopper lubricant. Since this material is readily available and very inexpensive, its use is preferred.

FIGS. 2 through 7 illustrate the details of the unloading assemblies 18 of the trailer 12. As is best shown in FIG. 4, each unloading assembly 18 comprises a conveyor 94 which passes through the hopper 16 and out the rear end of the trailer 12. As is best shown in FIG. 3, the conveyor 94 comprises a plurality of evenly spaced flights 96 and a pair of chains 100 connected to the opposite ends of the bars 96. The chains 100 move the flights 96 through the hopper 16 from front to rear along a course extending just over the floor 44. From the hopper 16, the flights 96 pass under the gate 102 that is hingedly supported at the rear of the trailer 12 and around a large diameter roller 104. From the roller 104, the chains 100 drive the flights 96 along a course extending under the hopper 16 and then under the sealing member 58 and into the front end of the hopper 16.

As is best shown in FIG. 4, the chains 100 each extend between a sprocket 106 positioned at the front of the trailer 12 and a sprocket 108 positioned at the rear of the trailer 12. As is shown in FIG. 7, the chains 100 are protected by a pair of channels 110 formed between the lower ends of the walls 48 and the floor 44 as they travel through the hopper 16. As the chains 100 pass under the hopper 16 on their return course, they are protected by a pair of flanges 112 extending from the sub-frames 46. The flights 96 of the conveyor 94 are purposely exposed during their travel along the return course so that any material from the hopper 16 which accumulates on or between the flights 96 during their travel through the hopper 16 is free to fall away from the flights 96 before they re-enter the hopper 16.

Referring now to FIGS. 5 and 6, the details of a drive system 119 for the conveyor assembly 18 are shown. A hydraulic motor 120 is attached to a plate 122 which is mounted in an extension 124 of the left side main beam 24 of the trailer 12. The motor 120 drives a sprocket 126 which in turn drives a chain 128. The chain 128 drives a sprocket 130 that comprises the input of a speed reducer 132. The speed reducer 132 drives a jack shaft 13 that extends through the rear of the trailer to a sprocket 136 that is positioned in an extension 138 of the right side main beam 24. The sprocket 136 drives a chain 140 which in turn drives a sprocket 142 that comprises the input of a shaft mounted speed reducer 144. The speed reducer 144 is mounted on a shaft 146 that extends across the back of the trailer 12. The shaft 146 supports and drives the sprockets 108 which in turn drive the chains 100. Thus, whenever hydraulic fluid is supplied to the motor 120, the motor rotates the shaft 146 through the speed reducer 132, the jack shaft 134 and the speed reducer 144. The shaft 146 in turn rotates the sprockets 108 which drive the conveyor 94.

Figure 8:
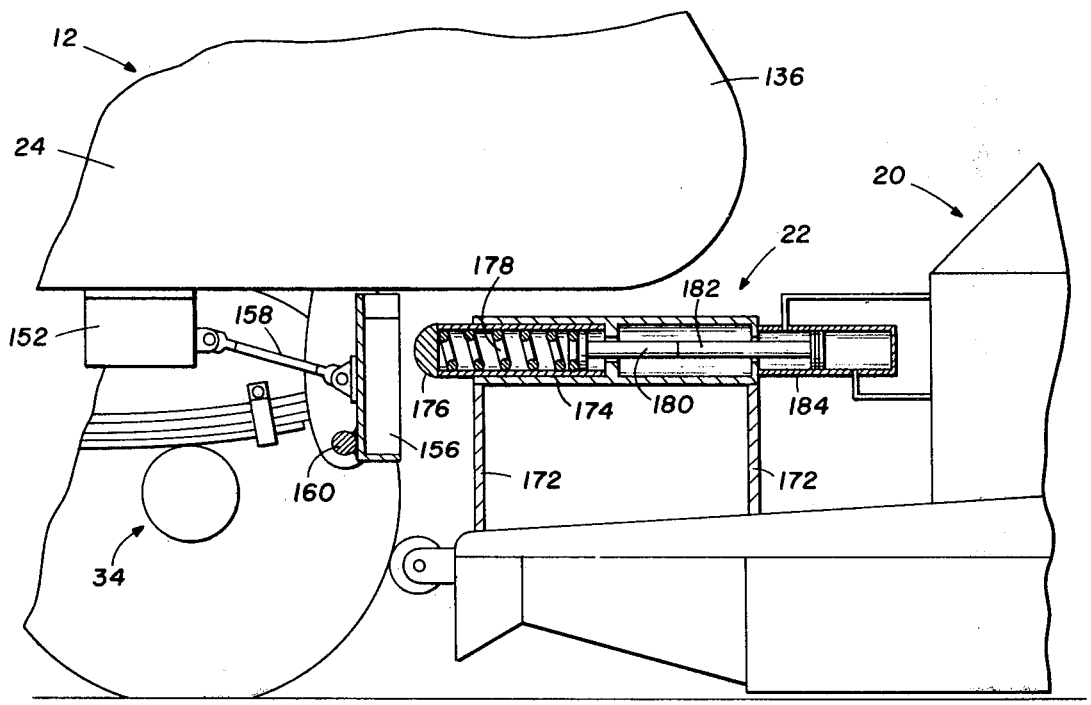
FIG. 8 is an enlarged similar view to FIG. 1 which illustrates the operation of the system.
Figure 9:
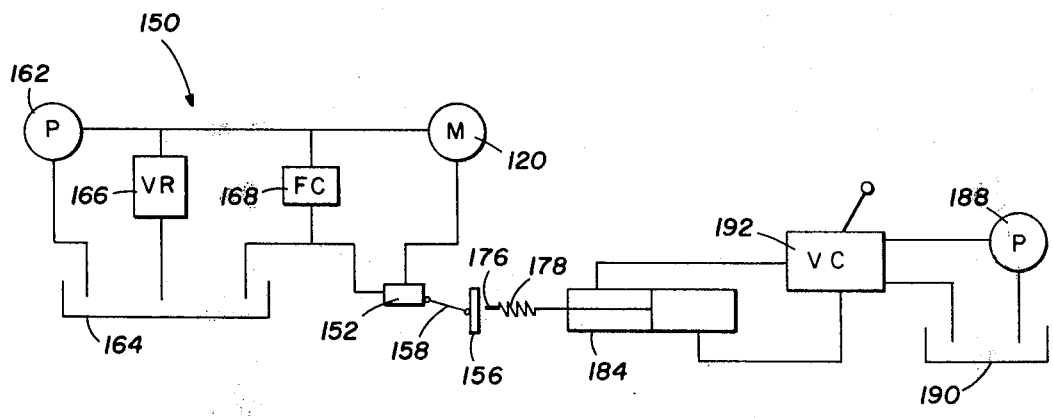
FIG. 9 is a schematic illustration of hydraulic circuitry employed in the system.

Referring now to FIGS. 8 and 9, the hydraulic motor 120 is operated by a hydraulic system 150 that is entirely contained within the trailer 12. The system 150 includes a control valve 152 which is secured to the bottom frame of the trailer. The valve 152 includes a rearwardly extending actuator that is coupled to a valve control pad 156 by a link 158. The pad 156 is pivotally supported on a shaft 160 that extends between the main beams 24 of the trailer 12. The valve 152 is so arranged that it is closed when the pad 156 is in the position shown and is open when the pad 156 is pivoted toward the valve 152.

The hydraulic system 150 of the trailer 12 further includes a pump 162 which forces hydraulic fluid from the tank 164 to the motor 120. A relief valve 166 and a pressure compensated flow control unit 168 are also included in the system 150. Thus, whenever the pad 156 is pivoted to open a valve 152, the pump 162 supplies hydraulic fluid to the motor 120 at a rate controlled by the flow control unit 188.

The control valve control pad arrangement of the system has utility in systems other than conveyor motor control systems. For example, such an arrangement could be used to control the brakes of delivery vehicles including dump trucks, and to thereby prevent separation of the vehicles and a paving machine or other receiving device. In such a case, operation of the control valve controls the flow of energizing fluid to the brakes of the vehicles.

The pad 156 of the trailer 12 is mounted for actuation by the prod 22 of the paving machine 20. The prod 22 is supported in the asphalt receiving portion of the paving machine by a pair of upwardly extending brackets 172. The prod 22 includes an outer cylinder 174 that is secured to the brackets 172 and a stinger 176 that is slidably supported in the outer cylinder 174. The stinger 176 is hollow and has a spring 178 positioned within it. A piston 180 extends into engagement with the spring 178 inside the stinger 176.

The piston 180 of the stinger is connected to a piston 182 which comprises a portion of a hydraulic cylinder 184. Whenever hydraulic fluid is directed into the blind end of the cylinder 184, the piston 182 of the cylinder is driven toward the front of the paving machine 20. The piston 182 forces the piston 180 toward the front of the paving machine which in turn operates through the spring 178 to drive the stinger 170 out of the cylinder 174 of the prod 22.

As is shown in FIG. 9, the cylinder 184 of the prod 22 is operated by a hydraulic control system 186 mounted on the paving machine 20. The system 186 includes a pump 188 which draws a hydraulic fluid from a tank 190. The pump supplies fluid to a contol valve 192 which controls the flow of fluid to and from the rod and blind ends of the cylinder 184. Thus, by operating the valve 192, the stinger 176 of the prod 22 can be either extended, withdrawn or maintained in any desired position.

When the stinger 176 of the prod 22 is withdrawn, its distal end is positioned about one inch from the valve control pads 156 of trailers 12 that are backed into engagement with the paving machine 20. Whenever a trailer is properly positioned for unloading into the paving machine 20, the valve 192 of the hydraulic system 186 is actuated to extend the stinger 176 of the prod 22. As the stinger 176 moves out of the cylinder 174, it pivots the pad 156 of the trailer toward the valve 152. This action opens the valve 152 to permit hydraulic fluid to flow to the motor 120. The motor 120 thereupon drives the unloading assembly 18 of the trailer 12 to unload asphalt from the trailer into the paving machine. The cylinder 184 and the spring 178 are designed to apply a contact pressure of about two hundred pounds between the stinger 176 of the prod 22 and the pad 156 of the trailer 12. This prevents accidental closings of the valve 152 during an unloading operation.

Figure 2:
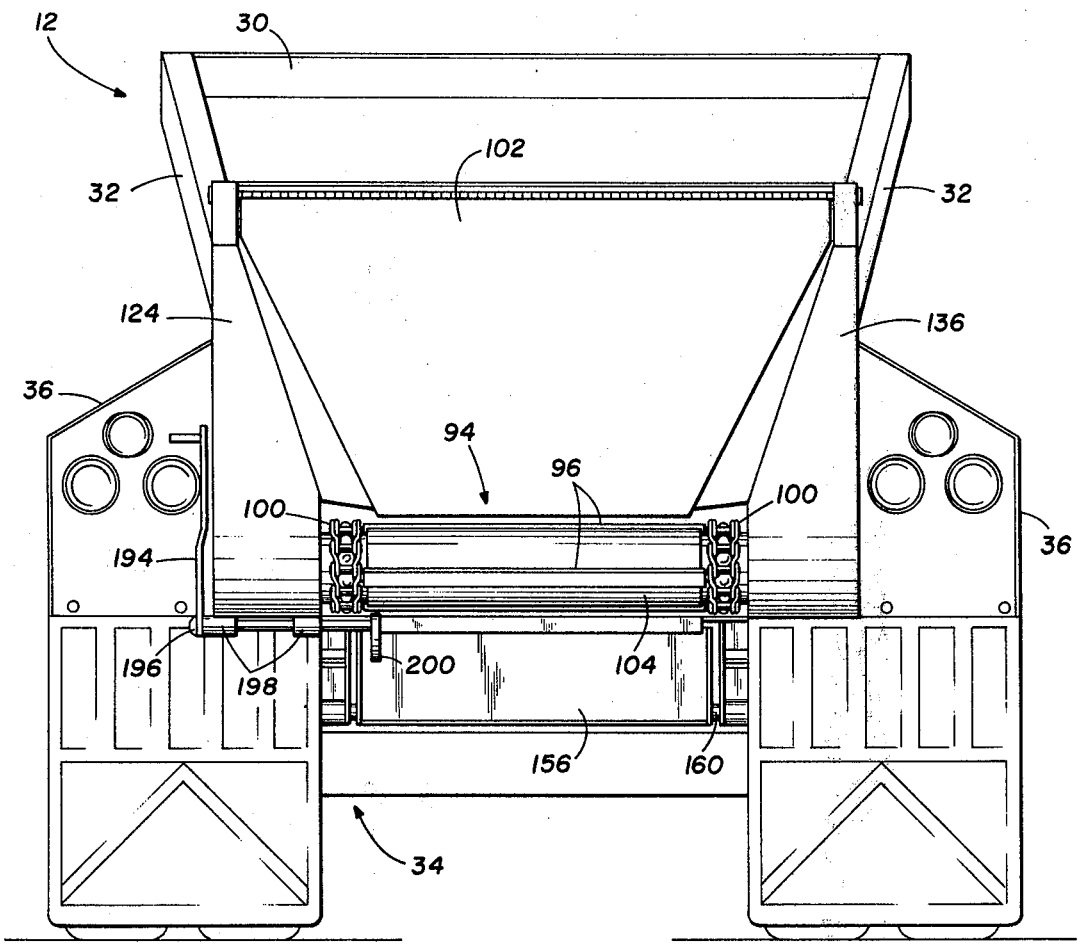
FIG. 2 is a back view of a semi-trailer employed in the system shown in FIG. 1.

Referring to FIG. 2, a lever 194 is secured to a shaft 196. The shaft 196 is pivotally supported in a tube 198 that is secured to the extension 124 of the left main beam 24 of the trailer 12. The shaft 196 extends to a cam 200 positioned for engagement with the pad 156 of the trailer. Thus, by operating the lever 194, the pad 156 may be pivoted to open the valve 152. This feature is useful whenever it is desired to unload the trailer other than into a paving machine. The lever may also be employed to control the unloading of a trailer 12 into a paving machine that is not equipped into a prod 22. Thus, by simply extending a rope from the lever 194 to the operator of the paving machine, the unloading of the trailer can be controlled from any paving machine.

It should be understood that the hydraulically actuated prod 22 illustrated in FIGS. 8 and 9 is exemplatory only and that many other structures may be employed to operate the valve control pads 156 of the trailers 12 and to thereby control the unloading of the trailers 12 from the lay down machine. For example, the paving machine can be equipped with a fixed rod having a spring loaded tip. Alternatively, an electrical system including a motor and lead screw arrangement can be employed. Finally, a mechanical pad pivoting structure comprising a pad engaging rod and a suitable lever system for advancing and retracting the rod can be employed. All that is required is to equip the paving machine with apparatus for pivoting the pad 156 when a trailer 12 is properly positioned relative to the paving machine.

In use, the material delivery system 10 transports hot asphalt from an asphalt mixing mechanism located at an asphalt plant to a paving machine 20 located at a paving site in one or more semi-trailers 12. The hopper 16 of each trailer 12 is lubricated prior to receiving asphalt from the asphalt mixing mechanism. This is accomplished by removing the cap 84 from the filler tube 80 and then pumping diesel oil into the tank 76. When the tank is full, the cap 84 is replaced and the tank 76 is pressurized with compressed air. The valve 88 is then opened to permit diesel oil from the tank 76 to flow through the tube 90 and onto the side walls 48 and the front wall 50 of the hopper 16.

When the lubrication of the trailer has been completed, hot asphalt is loaded into the trailer from the asphalt mixing mechanism. When the loading of the trailer 12 has been completed, the trailer is transported to the paving side by a tractor 14. At the paving site, the tractor 14 is operated to back the trailer 12 into engagement with the paving machine 20.

When the trailer 12 is properly positioned relative to the paving machine 20, the operator of the paving machine manipulates the control valve 192 of the hydraulic control system 186 on the paving machine to direct hydraulic fluid from the pump 188 to the blind end of the hydraulic cylinder 184. This action drives the stinger 176 out of the cylinder 174 of the prod 22. The stinger 176 pivots the valve control pad 156 on the trailer 12 to open the valve 152 of the hydraulic control system 150 of the trailer.

As soon as the valve 152 is open, the hydraulic system 150 supplies hydraulic fluid to the motor 120. The motor 120 in turn operates the conveyor 94 of the trailer 12 to unload asphalt from the hopper 16 into the paving machine 20. Of course, when the trailer 12 is employed to deliver asphalt to paving machines equipped with a fixed prod, the control pad 156 is pivoted to open the valve 152 as the trailer 12 is backed into engagement with the paving machine 20. In either case, should a separation between the trailer 12 and the paving machine 20 occur, disengagement of the prod on the paving machine from the pad 156 allows the pad to return to its normal position, whereupon the valve 152 of the trailer is closed. This action immediately terminates the unloading of the asphalt from the trailer 12.

The operation of the unloading assembly 18 of the trailer 12 is facilitated by the beam 60 of the hopper 16. The beam 60 supports the contents of the hopper 16 and thereby lessens the load on the conveyor 94. The amount of support provided depends upon the tendency of the material in the hopper 16 to "bridge" between the beam 60 and the walls 48. Asphalt exhibits a very marked tendency to bridge and, accordingly, the beam 60 greatly reduces the amount of power required to unload asphalt from the trailer 12.

During the operation of the trailer 12 illustrated in the Drawings, an interesting phenomenon has been observed. It appears that the amount of asphalt unloaded by the trailer is directly related to the height of the asphalt supporting beam 60 relative to the floor 44. Thus, if the conveyor 94 is operated at a uniform speed and the beam 60 is raised relative to the floor 44, more asphalt is unloaded. Conversely, if the beam is lowered relative to the floor 44, less asphalt is unloaded. Thus, the rate at which asphalt in unloaded from the trailer may be controlled in two ways. First, the flow control unit 168 of the hydraulic system 150 of the trailer is adjusted to control the rate of flow of hydraulic fluid to the motor 120. This controls the speed of operation of the conveyor 94. Second, the height of the beam 60 relative to the floor 44 may be adjusted. This controls the amount of asphalt that is unloaded by the conveyor during each incremental unit of conveyor travel. The height of the beam 60 relative to the floor 44 also directly effects the amount of power required to unload asphalt from the trailer.

The phenomenon which results in the controlled delivery of material is not fully understood. However, it will be noted from FIG. 7 that the beam 60 is substantially narrower than the conveyor system 94. This leaves at least two significant vertical columns of material which would appear to rest directly upon the conveyor. The bridging effects observed in the material are undoubtedly produced by horizontal pressures established in the vertical columns of material by the beam 60. These horizontal pressures are produced by the reduction in the cross-section of the hopper caused by the beam, and are enhanced by the sloping surfaces of the beam 60 which face the sloping side walls 48 of the hopper. The compaction resulting from road vibrations enhances these pressures. Immediately below the beam 60, the increased cross-sectional width of the hopper undoubtedly produces a layer of material having substantially lower horizontal pressures which prevent significant bridging. This apparently results in a horizontal preferential shear zone in the vicinity of the beam 60 which permits the conveyor to more easily shear the material along a substantial length of the hopper. Since the hopper has no rear wall, material is freely delivered at a height corresponding to the height of the baffle 60 throughout the delivery period. Thus, the rate of delivery is almost entirely related to the speed of the conveyor from the start of the delivery of the material until all the material has been delivered.

When the unloading of the trailer 12 has been completed, the operator of the paving machine 20 manipulates the control valve 190 of the hydraulic control system 186 on the paving machine 20 to withdraw the stinger 176 of the prod 22 into the cylinder 174. This permits the valve control pad 156 to return to its normal position, whereupon the valve 152 terminates the operation of the unloading assembly 18 of the trailer by discontinuing the flow of hydraulic fluid to the motor 120. In material delivery systems including paving machines equipped with fixed prods, this function is accomplished by simply driving the unloaded trailer away from the paving machine. In either case, the unloaded trailer is then returned to the asphalt plant by the tractor 14, whereupon it is relubricated and filled with another, second load of asphalt.

It should be understood that the trailers 12 of the delivery system 10 can be employed to deliver many materials in addition to hot asphalt. For example, the trailers 12 may be used to deliver sand and/or gravel to paving sites for use in forming a pavement base. In such a case, it normally is not necessary to lubricate the hoppers 16 of the trailers 12. Additionally, the trailers may be employed to transport raw aggregate to an asphalt plant on return trips from the paving site. In such a case, the trailers produce income on both legs of the trip. Finally, the trailer may be used to transport and unload materials entirely unrelated to the paving industry.

The unloading system illustrated in the Drawings is superior to prior delivery systems in several respects. For example, the use of the system does not involve the raising of a dump bed. Therefore, the trailers of the system do not tend to overturn, even when they are unloaded on a steep bank or grade. Further asphalt is unloaded by the system smoothly and evenly without tending to form into clumps that fall suddenly into a paving machine.

Another advantage of the material system shown in the Drawings over prior systems results from the use of the lubricating system and the asphalt supporting beam. Thses features of the system facilitate the unloading of asphalt from the trailers smoothly and evenly without placing an undue load on the unloading assemblies of the trailers.

A very important advantage inherent in the present material delivery system involves the controlling of the unloading assemblies of the system from the paving machine. This assures the immediate termination of the delivery of asphalt upon any separation between the trailers of the system and the paving machine. Thus, the problem of removing asphalt accidentally dumped in front of a paving machine which has plagued prior delivery systems is completely eliminated.

Yet another advantage of the material delivery system disclosed herein results from the positioning of the hydraulic systems that drive the unloading assemblies on the trailers for control from the paving machine. This permits unloading of the trailers other than into a paving machine. It also allows the trailers to be unloaded into the paving machines not equipped with prods.

Referring now to FIGS. 10 and 11, there is shown a semi-trailer 202 incorporating a conveyor system that is particularly adapted for use with slip-form concrete and similar materials. The trailer 202 is constructed similarly to the trailer 12 in that it comprises a hopper 204 including a pair of side walls 206 that slope downwardly and inwardly between a pair of top beams 208 and a pair of main beams 210. A pair of end beams 212 and 214 extend transversely of the trailer 202 between the fore and aft ends of the top beams 208, respectively. A front wall 216 slopes downwardly and inwardly from the end beam 212, and a floor 218 extends rearwardly from the lower end of the front wall 216 between the side walls 206. A material supporting beam 220 extends longitudinally through the hopper 204 over the floor 218 and between the side walls 206.

The trailer 202 further includes a conveyor 222 comprising a pair of chains 224 and a plurality of flights 226. The conveyor 22 is preferably constructed in accordance with the disclosure of th co-pending application of John H. Holland, filed Oct. 19, 1970, Ser. No. 81,794, now abandoned and is preferably operated by a drive system constructed substantially identically to the conveyor drive system 119 illustrated in FIGS. 5 and 6. In use, the drive system operates the conveyor 222 to unload material from the hopper 204 of the trailer 202 through a chute 228 located at the rear of the trailer.

Figure 12:
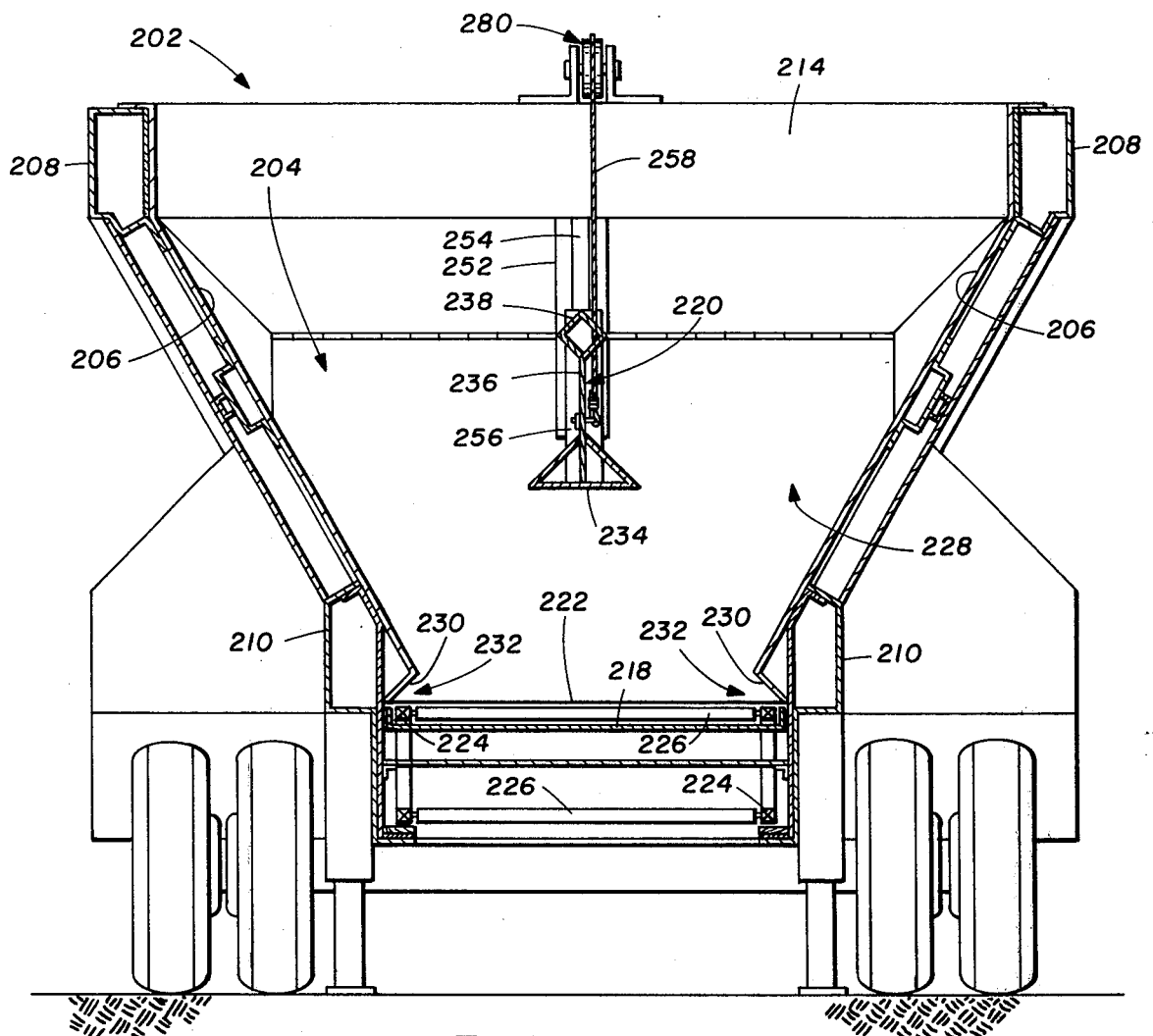
FIG. 12 is a sectional view taken generally along the line 12—12 in FIG. 10.

There are two major differences between the trailer 202 and the trailer 12 which combine to facilitate thorough cleaning of the trailer 202 following the transportation of slip-form concrete an similar materials. Referring to FIG. 12, the first difference relates to the bottoms of the side walls 206 which comprise downwardly and outwardly sloping portions 230. The portions 230 define triangular channels 232 which protect the chains 224 of the conveyor 222 and at the same time facilitate cleaning of the lower portions of the hopper 204. Such cleaning is accomplished by directing a high pressure water spray into the channels 232 to dislodge the remnants of a load of slip-form concrete or similar material from the links of the chains 224 and the other components of the conveyor 222, whereby the components do not become clogged with hardened concrete, etc.

Another important distinction between the trailer 202 and the trailer 12 comprises the construction of the material supporting beam 220. As is clearly shown in FIG. 12, the beam 220 comprises a material supporting member 234 having a triangular cross-section, a web 236 that extends upwardly through the material supporting member 234, and a stiffening member 238 having a diamond cross-section. The components 234, 236 and 238 of the beam 220 are welded one to the other to form a beam that is extremely resistant to bending in the vertical direction.

As is best shown in FIG. 10, the bending-resistant construction of the beam 220 permits support of the beam 220 at its fore and aft ends only, and completely eliminates the need for intermediate supports similar to the support assemblies 66 for the beam 60 of the trailer 12. This facilitates the movement of slip-form concrete and similar materials through the hopper 204 under the action of the conveyor 222, and eliminates the necessity of cleaning the intermediate supports following the delivery of such materials.

The most important distinction between the trailer 202 and the trailer 12 comprises the mounting of the material supporting beam 220 of the trailer 202 for vertical movement relative to the hopper 204. As is best shown in FIG. 11, a guide 240 of inverted U-shaped corss-section is welded to the front end of the material supporting beam 220. The guide 240 receives a track 242 which is welded to the front wall 216 of the hopper 204. A cable 244 is connected to the material supporting beam 220 and extends upwardly therefrom around a pulley 246 which is supported on the end beam 212. The cable 244 then extends downwardly through apertures formed in the upper portion of a gooseneck 248 which comprises the front end of the trailer 202. The end of the cable 244 remote from the beam 220 is attached to a hydraulic cylinder 250 for actuation thereby to raise and lower the front end of the beam relative to the hopper 204.

Figure 13:
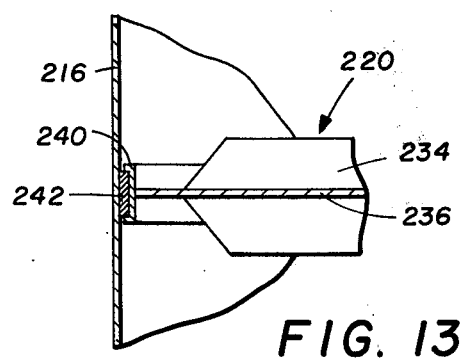
FIG. 13 is a sectional view taken generally along the line 13—13 in FIG. 11.

At the rear end of the trailer 202, a beam 252 extends downwardly from the end beam 214. As is best shown in FIG. 13, the beam 252 is triangular in cross-section and supports a rail 254. The rail 254 extends at the same angle as the rail 242 and is received in a guide 256 of inverted U-shaped cross-section which is welded to the rear end of the material supporting beam 220. A cable 258 is attached to the material supporting beam 220 and extends upwardly therefrom and around a pulley 260 which is mounted on the end beam 214. The end of the cable remote from the beam 220 is attached to a hydraulic cylinder 262 whereby upon actuation of the cylinder 262, the rear end of the beam 220 may be raised and lowered relative to the hopper 204.

From the foregoing, it will be apparent that by operating the hydraulic cylinders 250 and 262 in unison, the material supporting beam 220 may be positioned at virtually any selected height within the hopper 204 of the trailer 202. The material supporting beam 220 serves th same function in the trailer 202 as the material supporting beam 60 of the trailer 12. That is, the downwardly diverging surfaces of the lower portion 234 of the beam 220 cooperate with the downwardly converging side walls 206 of the hopper 204 to form a zone of increased horizontal pressures in material transported in the trailer which tends to cause bridging of the material in the zone. At the same time, a zone of substantially reduced horizontal pressure is formed just below the bridging zone, whereby the conveyor 222 is adapted to shear material out of the hopper 204 along a line corresponding to the positioning of the lowermost portion 234 of the beam 220. By this means the conveyor 222 transports material out of the trailer 202 at a height corresponding to the height of the beam 220 and, accordingly, by operating the cylinders 250 and 162 to raise of lower the beam, the quantity of material that is unloaded from the trailer 202 per increment of conveyor travel may be adjusted.

The adjustable positioning of the beam 220 may be utilized in the practice of the present invention in various ways. For example, the trailer 202 may be equipped with a constant speed conveyor drive system. In such a case, the height of the beam 220 is adjusted to control the rate that material is delivered from the conveyor. In the preferred form, the conveyor drive system is adjustable, that is, the drive system is constructed substantially identically to the conveyor drive system 119 of the trailer 12. In such a case the beam 220 is positioned to establish a basic delivery rate and the speed of operation of the conveyor is thereafter adjusted to "fine tune" a delivery rate from the trailer 202. One important consideration in the latter situation is that the basic height of the beam within the hopper 204 may vary for different materials that are transported by the trailer 202. That is, the beam might be positioned at a first height when the trailer is used to transport sand, at a second height when the trailer is used to transport slip-form concrete, and at a third height when the trailer is used to transport hot asphalt. Such a situation is readily accommodated in the construction illustrated in FIGS. 10 through 13, whereby the height of the beam is readily altered by simply operating the hydraulic cylinders 250 and 262.

Figure 14:
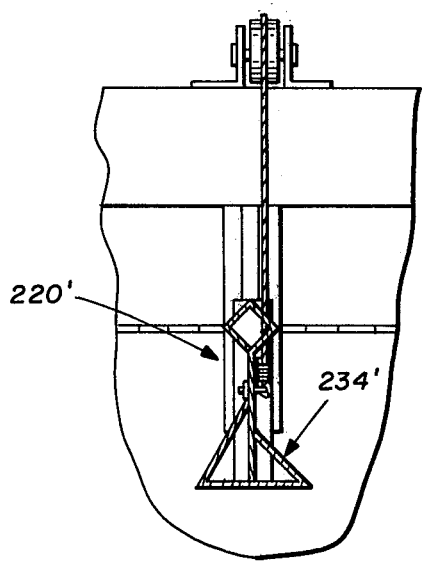
FIG. 14 is a view similar to FIG. 12 which illustrates the operation of the second embodiment of the semi-trailer.

The extent to which the positioning of the material supporting beam 220 in the hopper 204 controls the delivery rate from the trailer 202 is best illustrated in FIG. 14. A material supporting beam 220' was equipped with a material supporting member 234' constructed from plates extending at different angles. When the resulting beam was employed in a trailer otherwise constructed as shown in FIGS. 10, 11, 12 and 13, material flowed from one side of the chute 228 of the trailer at a level corresponding to the apex of one of the angles and simultaneously flowed from the other side of the chute at a level corresponding to the apex of the other angle. Thus, it will be apparent that the positioning of the material supporting beam 234 provides absolute control over the height of the material that is transported out of the trailer 204 through the chute 228 by the conveyor 222.

It will be appreciated that various modifications to the structural components of the trailer 202 may be employed, if desired. For example, the channels 232 need not be triangular in shape, but can have any desired shape so long as both protection for the components of the conveyor 222 and access to the conveyor for cleaning purposes are provided. Similarly, the components of the beam 220 may have various shapes so long as the material supporting member 234 has downwardly diverging sides and sufficient structural rigidity is provided to eliminate the necessity of supporting the beam intermediate its ends. Finally, various modifications to the structure provided for raising and lowering the beam 220 may be provided, if desired. For example, powered or manually operated lead screws, various pawl and ratchet jacking mechanisms, winch-type mechanisms, etc., can be employed to raise and lower the material supporting beam.

Those skilled in the art will also appreciate the fact that the present invention is readily adapted to use in applications other than semi-trailers. For example, the invention can be utilized instationary installations, such as bins for receiving coal, sand, gravel, cement, etc. Also, the invention can be employed in vehicles other than semi-trailers, for example, in the surge bin of a slip-form concrete paving machine.

From the foregoing, it will be understood that the present invention comprises a conveyor system including a hopper, a conveyor for moving material relative to the hopper, and a material supporting member mounted in the hopper and selectively positionable to control the volume of the material moved by the conveyor. The hopper is constructed to permit ready access to the components of the conveyor, and the material supporting member is supported at its end only, whereby cleaning of the system is facilitated. The use of the invention is highly advantageous in the delivery and unloading of slip-form concrete and similar materials. The positionable material supporting member may also be advantageously incorporated into conveyor systems adapted for use with other materials, including hot asphalt, etc.

Although preferred embodiments of the invention have been illustrated in the Drawings and described in the foregoing specification, it will be understood that the invention is not limited to the specific embodiments disclosed, but is capable of numerous rearrangements, modifications, and substitutions of parts and elements without departing from the spirit of the invention.

What is claimed is:

1. The system for delivering a batch of particulate material at a controlled rate which comprises:
   conveyor means for transporting particulate material from a receiving zone to a delivery end spaced from the receiving zone,
   hopper means disposed above the receiving zone of the conveyor means and comprising a pair of side walls disposed along the sides of the conveyor means and an end wall disposed across the end of the conveyor means remote from the delivery end,
   the side walls extending beyond the receiving zone toward the delivery end of the conveyor,
   the hopper means having baffle means extending through the receiving zone parallel to and spaced above the conveyor means,
   said baffle means leaving a substantial portion of the conveyor means exposed vertically to the material above the baffle means,
   said baffle means having surfaces which diverge downwardly from an apex for establishing increased horizontal pressures in a horizontal tube tending to cause bridging of the material in the zone and an upwrdly extending web for supporting the downwardly diverging surfaces,
   said baffle means further comprising a stiffening web extending substantially vertically from the apex and along substantially the entire length of the baffle means whereby the baffle means is adapted to be supported solely at its ends,
   the hopper means having an open delivery end to at least the height of the horizontal zone whereby the particulate material will tend to shear longitudinally along the length of the receiving zone in said horizontal zone as a result of the bridging tendencies of the material and will be delivered from the receiving zone to the delivery end at a volumetric rate determined by the cross-sectional area of the hopper means below the horizontal zone and the speed of the conveyor means.

2. The system according to claim 1 wherein the baffle means further comprises stiffening means extending along the upper edge of the upwardly extending web.

3. The system according to claim 2 wherein the baffle means is further characterized by a lowermost member of triangular cross-section which comprises the downwardly diverging surfaces, wherein the web is welded to and extends vertically upwardly from the lowermost member, and wherein the stiffening means comprises a member connected to the uppermost portion to the vertically extending web.

4. The system according to claim 3 wherein the baffle means extends the entire length of the receiving zone and wherein the hopper means further comprises means for supporting the baffle means solely at its ends.

5. The semi-trailer for transporting a load of particulate material and delivering the material at a controlled rate which comprises:
   chassis means forming a hopper for receiving the material and having downwardly and inwardly sloping side walls,
   wheels disposed to the rear of the hopper for supporting the rear end of the semi-trailer,
   means disposed in front of the hopper for connecting the semi-trailer to a tractor,
   chute means extending from the hopper to the rear of the wheels,
   conveyor means extending the length of the bottom of the hopper for receiving material by gravity from the hopper and rearwardly through the chute means for transporting material from the hopper to a point to the rear of the wheels,
   baffle means extending longitudinally of the hopper for creating a generally horizontal zone of material at a height above the conveyor means which is horizontally compacted to a greater extent than the adjacent material thereunder,
   the baffle means including a member of triangular cross-section and comprising downwardly and outwardly sloping walls and a vertically extending web for supporting the triangular member,
   the rear end of the hopper and the chute having an opening substantially corresponding at least to te cross-sectional area of the hopper below said horizontal layer of material such that all material in the hopper below the horizontal zone may move substantially parallel to the conveyor means to the delivery end, and
   means for controlling the rate at which the conveying means moves to thereby control the rate at which the material is delivered.

6. The semi-trailer according to claim 5 wherein the baffle means is further characterized by a stiffening member extending along the top of the vertically extending web and wherein the triangular member, the web and the stiffening member all extend substantially the entire length of the hopper.

7. The semi-trailer according to claim 6 further including means for selectively varying the vertical positioning of the baffle means in the hopper and thereby providing additional means for controlling the rate at which material is delivered.

8. The semi-trailer according to claim 7 wherein the means varying the positioning of the baffle means in the hopper comprises power driven means whereby the baffle may be raised or lowered in the hopper when the hopper is full of particulate material.

* * * * *